United States Patent
Bachtiger (10) Patent No.: US 11,410,661 B1
(45) Date of Patent: Aug. 9, 2022

(54) SYSTEMS AND METHODS FOR ANALYZING AUDIO CONTENT

(71) Applicant: Walter Bachtiger, Novato, CA (US)

(72) Inventor: Walter Bachtiger, Novato, CA (US)

(*) Notice: Subject to any disclaimer, the term of this patent is extended or adjusted under 35 U.S.C. 154(b) by 116 days.

(21) Appl. No.: 16/926,827

(22) Filed: Jul. 13, 2020

Related U.S. Application Data (63) Continuation-in-part of application No. 15/894,730, filed on Feb. 12, 2018, now abandoned.

(60) Provisional application No. 62/474,490, filed on Mar. 21, 2017, provisional application No. 62/459,970, filed on Feb. 16, 2017.

(51) Int. Cl.
| | |
|---|---|
| *G10L 15/26* | (2006.01) |
| *G06F 16/16* | (2019.01) |
| *G06Q 30/02* | (2012.01) |
| *G06F 21/62* | (2013.01) |

(52) U.S. Cl.
CPC .......... *G10L 15/26* (2013.01); *G06F 16/164* (2019.01); *G06F 21/6245* (2013.01); *G06Q 30/0282* (2013.01)

(58) Field of Classification Search
CPC ... G10L 15/26; G06F 16/164; G06F 21/6245; G06Q 30/0282
See application file for complete search history.

(56) References Cited

U.S. PATENT DOCUMENTS

| | | | | |
|---|---|---|---|---|
| 9,472,186 B1* | 10/2016 | Clark | .............. | G16H 15/00 |
| 9,686,087 B2* | 6/2017 | Chang | ............... | H04L 12/1827 |
| 10,236,017 B1* | 3/2019 | Witt-Ehsani | ............ | G06F 40/35 |
| 2008/0010319 A1* | 1/2008 | Vonarburg | .......... | G06F 3/04842 |
| 2008/0267403 A1* | 10/2008 | Boult | .................... | H04L 9/0894 |
| | | | | 380/255 |
| 2009/0100032 A1* | 4/2009 | Jones | ................. | G06Q 30/0224 |
| | | | | 707/999.005 |
| 2012/0035925 A1* | 2/2012 | Friend | ..................... | G06F 16/68 |
| | | | | 704/235 |
| 2013/0103702 A1* | 4/2013 | Solheim | ................ | G06F 16/319 |
| | | | | 707/755 |
| 2015/0100302 A1* | 4/2015 | Flaks | .................. | H04M 3/5175 |
| | | | | 704/9 |
| 2015/0206544 A1* | 7/2015 | Carter | ..................... | G10L 25/87 |
| | | | | 704/235 |
| 2015/0279390 A1* | 10/2015 | Mani | ....................... | G10L 25/48 |
| | | | | 704/235 |
| 2016/0026253 A1* | 1/2016 | Bradski | ............... | H04N 13/128 |
| | | | | 345/8 |

(Continued)

*Primary Examiner* — Michael Colucci (57) ABSTRACT

A system for analyzing audio content is disclosed. In general, the system includes a transcription module, a correlation module, and a database. The transcription module is configured to receive a plurality of audio (and video) files generated by a plurality of different sources, execute speech-to-text transcriptions in real-time based on portions of audio content included within the audio files, and generate written transcripts of such transcriptions. The correlation module is configured to receive metadata associated with each of such audio files, derive correlations between such written transcripts and metadata, and report such correlations to a user of the system (and/or conclusions and classifications based on such correlations). The database is configured to receive, record, and make accessible for searching and review the correlations generated by the correlation module.

19 Claims, 6 Drawing Sheets

(56) References Cited

U.S. PATENT DOCUMENTS

| | | | |
|---|---|---|---|
| 2017/0124465 A1* | 5/2017 | Yang | G06Q 30/02 |
| 2018/0032533 A1* | 2/2018 | Singh | G06F 16/355 |
| 2018/0143974 A1* | 5/2018 | Skarbovsky | G06F 40/58 |
| 2019/0334952 A1* | 10/2019 | Dhoble | H04L 63/20 |
| 2022/0036253 A1* | 2/2022 | Brutsche | G06Q 10/02 |

* cited by examiner

SYSTEMS AND METHODS FOR ANALYZING AUDIO CONTENT

CROSS-REFERENCE TO RELATED APPLICATIONS

This application is a continuation-in-part application of U.S. patent application Ser. No. 15/894,730, filed on Feb. 12, 2018, which claims priority to, and incorporates by reference, U.S. provisional application Ser. No. 62/459,970, filed Feb. 16, 2017, and U.S. provisional application Ser. No. 62/474,490, filed Mar. 21, 2017.

FIELD OF THE INVENTION

The field of the present invention relates to systems and methods for analyzing audio content in real-time (or near real-time). More specifically, the present invention relates to systems and methods that are configured to transcribe audio content into text, derive correlations between the text and certain outcomes (and metadata) associated with the original audio content, and report such correlations to users of the systems—during the course of a speech or conversation. In addition, the present invention relates to systems and methods that are configured to (i) transcribe audio content into text, (ii) generate custom outputs that are associated with the text and certain outcomes (and metadata) associated with the original audio content (such as outputs in the nature of classifications, scores, and rankings attributed to the audio content, as well as summarizations and conclusions derived from the correlations mentioned above), and (iii) report such outputs to users of the systems in real-time (or near real-time).

BACKGROUND OF THE INVENTION

Businesses and other organizations would benefit from an improved ability to extract relevant information and data from conversations that employees have with existing customers, prospective customers, collaborators, and other third parties (and an improved ability to provide feedback and/or advice during the course of such conversations). In some cases, however, when representatives of a business or organization have many contacts, and engage in many of such conversations on a day-to-day basis, the volume of such conversations can make extracting relevant information and data very challenging—and potentially very time consuming. In addition, extracting such information and data from a plurality of such conversations in a systematic and standardized manner can be difficult. Accordingly, it would be advantageous to develop certain systems and methods that could be used to systematically, efficiently, and accurately analyze such conversations in real-time, extract relevant information and data from such conversations (both at the individual and aggregate levels), and report such information and data to a user in real-time (and preferably in a way that such information and data could later be searched, mined, and reviewed).

As described further below, the present invention addresses many of these (and other) demands in the marketplace.

SUMMARY OF THE INVENTION

According to certain aspects of the present invention, systems and methods for analyzing audio content are provided. More specifically, the present invention relates to systems and methods that are configured to transcribe audio content into text as a speech or conversation is occurring, derive correlations between the text and certain outcomes (and metadata) associated with the original audio content (as well as calculate certain custom outputs that are associated with the text and such outcomes (and metadata) associated with the original audio content), and report such correlations and outputs to users of the systems. In addition, the system is configured to report conclusions and/or summarizations of such correlations and outputs to users of the systems. The invention provides that the systems of the present invention are particularly useful for performing "big data" analyses of audio files and verbal exchanges between employees and external third parties. As described further below, in certain embodiments, the systems of the present invention generally include a transcription module, a correlation module, and a database. In addition, the systems optionally include a microphone and user interface, as described further below. The invention provides that a microphone may be used in the systems of the present invention, particularly when audio content is being streamed live to the system from a third party device.

The invention provides that the transcription module is configured to receive a plurality of audio files generated by a plurality of different sources (e.g., different conversations or different means of delivering live speech), and then execute speech-to-text transcriptions based on such audio content or portions thereof. The transcription module is configured to generate written transcripts of such audio content or portions thereof in real-time, and transmit such transcriptions to the correlation module in real-time. The invention provides that the correlation module is configured to receive metadata associated with each of such audio files (and transcriptions thereof), derive correlations between such written transcripts (and/or portions or segments thereof) and metadata (and, in some embodiments, derive the custom outputs mentioned above), and report such correlations and outputs to a user of the system (either after sufficient information has been collected or through repeated reports having increasing levels of information and confidence).

In addition, the invention provides that the system is also capable of importing (or directly measuring) specific characteristics of the audio content, including without limitation amplitudes and frequencies of the speech (and detecting speech tones, such as signaling tones). The invention further includes a database in communication with the correlation module, and such database is configured to receive, record, and make accessible for searching and subsequent review the correlations generated by the correlation module (along with the custom outputs mentioned above, and summarizations and conclusions related to the foregoing). The invention provides that the system may also be used, for example, to further analyze and improve such correlations. For example, if a business utilizes the system to identify certain words that "predict" whether a sale will be made, the system may be used to further test whether such "predictors" are indeed sufficiently correlated with a sale (and/or to modify and refine the words that should serve as such "predictors").

The invention provides that the metadata used by the system may include various forms of metadata. More specifically, the correlation module may utilize certain user-defined metadata, which is specified by each of the plurality of different sources. The user-defined metadata may be categorized into one of a plurality of different pre-defined categories. For example, in the case of certain analyses that a business may want to perform, non-limiting examples of such pre-defined categories may indicate to the user of the system, e.g., whether a person who is featured in the audio content purchased a product or service, submitted a complaint about a product or service, received unsatisfactory responses to questions submitted, received satisfactory responses to questions submitted, or combinations of the foregoing. Still further, the pre-defined categories of user-defined metadata may include one or more free-form categories, which are entirely defined by and unique to each of the plurality of different sources (as described further below).

In addition, the invention provides that the metadata may also include certain machine-derived metadata, i.e., metadata that the system automatically harvests from a set of audio files. More specifically, for example, the machine-derived metadata may be a geographical region from which certain audio content originated, demographic information that is correlated with such geographical region, a phone number from which the audio content originated, whether information disclosed in the audio content warrants privacy protection, a length of time that represents a duration of the audio content, tone-related data, amplitude-related data, frequency-related data, rates of change data, and combinations of the foregoing. The invention provides that the correlation module is configured to derive correlations between the written transcripts and such metadata (including both user-defined metadata and machine-derived metadata) by detecting, for example, words that are present in the written transcripts a specified minimum number of times, word combinations that are present in the written transcripts, a word in a defined relationship with another word in the written transcripts, semantic content, or combinations or variations of the foregoing.

The invention provides that the different components of the system described herein may exist within a single machine. In other embodiments, the various components of the system may exist within separate machines, which are operably connected and in communication with each other. For example, the invention provides that the transcription module, correlation module, database, microphone (optional), and user interface may exist within separate machines or within a single unified machine. As explained above, the invention provides that a microphone may be used in the systems of the present invention when audio content is being streamed live to the system.

In addition to the systems described above, the present invention further encompasses methods for analyzing audio content and, specifically, methods for transcribing audio content into text, deriving correlations between the text and certain outcomes (and metadata) associated with the original audio content, and reporting such correlations and custom outputs to users of the systems, as described further below.

The above-mentioned and additional features of the present invention are further illustrated in the Detailed Description contained herein.

DETAILED DESCRIPTION OF THE INVENTION

The following will describe, in detail, several preferred embodiments of the present invention. These embodiments are provided by way of explanation only, and thus, should not unduly restrict the scope of the invention. In fact, those of ordinary skill in the art will appreciate upon reading the present specification and viewing the present drawings that the invention teaches many variations and modifications, and that numerous variations of the invention may be employed, used and made without departing from the scope and spirit of the invention.

Referring now to FIGS. 1-6, according to certain preferred embodiments of the present invention, systems and methods for analyzing audio content are provided. More specifically, the present invention relates to systems and methods that are configured to transcribe audio content into text in real-time, derive correlations between the text and certain outcomes (and metadata) associated with the original audio content (along with certain outputs associated with the audio content and such correlations) in real-time, and report such correlations and outputs to users of the systems (the timing and frequency of such reports are described further below). The systems and methods described herein may be used to perform a variety of tasks and analyses, including so-called "big data" analyses. For example, a business may utilize the systems described herein to analyze a set of audio files that pertain to various sales proposals. The business may, for example, analyze a first set of audio files (that represent sales proposals that were not successful) and identify whether there were certain words spoken during those proposals that are heavily correlated with that negative outcome—i.e., to identify word-based "predictors" of those negative outcomes. Likewise, the business may analyze a second set of audio files (that represent sales proposals that were successful) and identify whether there were certain words spoken during those proposals that are heavily correlated with that positive outcome—i.e., to identify word-based "predictors" of those positive outcomes. The invention provides that the analysis of the different sets of audio files may be performed incrementally on portions of such audio files that correspond to times in the recordings (or counts of words spoken) that simulate the real-time acquisition and accumulation of information during a live speech or conversation.

That is, using a plurality of speech-to-text transcriptions (generated from such audio files) as described further below, the systems and methods of the invention may be used to cluster audio files into similar subgroups; to derive audio file association rules that could be applied to future audio file transcriptions (and future business activities); to determine the relative importance of certain words (as "predictors") recited within the audio files to desired outcomes; and to perform other "big data" analyses that would be beneficial to a business or other organization. In addition, the invention provides that the system may also be used, for example, to further analyze and improve such correlations. For example, if a business utilizes the system to identify certain words that "predict" whether a sale will be made, the system may be used to further test whether such "predictors" are indeed sufficiently correlated with a sale—and/or to modify and refine the words that should serve as such "predictors" of a prospective sale.

In certain embodiments, the systems of the present invention include a transcription module 10, a correlation module 12, and a database 14—all operably connected and in communication with each other. In addition, in certain embodiments, the systems may optionally include a microphone 16 and user interface 18, as described further below. The invention provides that the transcription module 10 is configured to receive a plurality of audio files 20 generated by a plurality of different sources (e.g., different conversations)—or a plurality of audio files 20 that represent discrete portions or segments of a live audio stream or a plurality of live streams—and to execute speech-to-text transcriptions based on the audio content included within the audio files 20. To clarify, the term "audio files" 20 as used herein includes without limitation files corresponding to one or more live audio streams; files corresponding to one or more segments of live audio streams; and files corresponding to short segments of speech. The transcription module 10 is configured to then generate written transcripts 22 of such transcriptions, and transmit such written transcripts 22 to the correlation module 12. The speech-to-text transcriptions are preferably executed in real-time, e.g., as audio content is (or contiguous segments thereof are) being created and captured by a microphone 16 (and streamed to the system). In other embodiments, the transcription module 10 may be provided with a set of audio files 20 that were created over a period of time (i.e., the previously recorded set of audio files 20 may be digitally transmitted to the system). The invention provides that such written transcripts 22—which are representative of real-time streams of speech or conversations (or discrete portions thereof)—are, preferably, provided to the correlation module 12 immediately following the generation of such transcripts 22.

The invention provides that the correlation module 12 is configured to derive correlations between such written transcripts 22 and certain metadata 24 that is provided to the system. More particularly, the correlation module 12 is configured to receive metadata 24 associated with each of such audio files 20 and/or portions thereof (and transcriptions 22 thereof), derive correlations between such written transcripts 22 and metadata 24 (FIG. 5), and report such correlations to a user of the system. In addition, the invention provides that the correlation module 12 is configured to calculate certain outputs associated with the audio content and/or derived correlations, such as outputs in the nature of classifications, scores, and rankings attributed to the audio content, as well as summarizations and conclusions derived from the correlations mentioned above. The invention provides that, in certain embodiments, the correlation module 12 is configured to derive such correlations between written transcripts 22 and metadata 24 in real-time (e.g., as audio content is being streamed to the system), and immediately report such correlations (and related outputs) to a user of the system in real-time. In such embodiments, as the number of words that are transcribed grows, and as the size of the transcripts 22 become larger, the statistical accuracy or confidence associated with the derived correlations will preferably improve. In other embodiments, the correlation module 12 may be configured to issue such reports only upon reaching a defined threshold number of words that have been transcribed within the written transcripts 22. The systems of the present invention further include at least one database 14 in communication with the correlation module 12, and such database 14 is configured to receive, record, and make accessible such metadata 24 for use by the correlation module 12 (and for recording, searching, and reviewing the correlations and outputs generated by the correlation module 12).

In such embodiments, the invention provides that the metadata 24 may include various forms of metadata 24 (e.g., such metadata 24 may include user-defined metadata 26 and machine-derived metadata 28). More specifically, the correlation module 12 may utilize certain user-defined metadata 26, which is specified by each of the plurality of different sources (or by the user of the system that is performing a particular analysis). The user-defined metadata 26 may be provided to the system, and recorded in the database 14, through a user interface 18 of the system. In certain embodiments, the provision of such user-defined metadata 26 may also be executed remotely, e.g., through an external Internet portal that is capable of communicating with the database 14 of the system. The user-defined metadata 26 may be categorized into one of a plurality of different pre-defined categories. For example, in the case of certain analyses that a business may want to perform, non-limiting examples of such pre-defined categories may indicate to the user of the system, e.g., whether a person (customer) who is featured in the audio content purchased a product or service, submitted a complaint about a product or service, received unsatisfactory responses to questions submitted, received satisfactory responses to questions submitted, is indicating a willingness or unwillingness to complete a purchase, or combinations of the foregoing. Still further, the invention provides that the pre-defined categories of user-defined metadata 26 may include one or more free-form categories, which are entirely defined by and unique to each of the plurality of different sources. That is, in addition to the common types of metadata 24 that certain types of users may want to analyze (e.g., whether a customer purchased a product), the user may specify certain user-defined metadata 26 that is entirely unique to a particular business/user—e.g., whether specific types of questions are asked of sales people about a specific feature of a specific product or service.

In addition, the invention provides that the metadata 24 may also include certain machine-derived metadata 28, i.e., metadata that are automatically harvested by the system (e.g., the correlation module 12) as it analyzes an audio file 20/transcript 22. Non-limiting examples of such machine-derived metadata 28 may include a geographical region from which the audio content originated, demographic information that is correlated with such geographical region, a phone number from which the audio content originated, whether information disclosed in the audio content warrants privacy protection, a length of time that represents a duration of the audio content, word count data, word timing data, volume data, speech energy data, tone-related data, amplitude-related data, frequency-related data, rates of change data, and/or combinations or variations of the foregoing. In addition, for example, the invention provides that such machine-derived metadata 28 may include a phone number from which the audio files 20 originated. Such machine-derived metadata 28 may further be used to identify a geographical region from which the audio files 20 originated, e.g., based on the area code of the detected phone number. The identified geographical region data may, in turn, be used to correlate additional information about the region, such as an average income level or average net worth of individuals living in the geographical region. The invention provides that the correlation module 12 will be operably connected to, and in communication with, the database 14 that is configured to store such machine-derived metadata 28 (and call up such information when queried by a system user). The invention provides that such machine-derived metadata 28 and associated information may be viewed in real-time (e.g., while the audio files 20 are being analyzed by the system) or anytime thereafter through the user interface 18 of the system.

More particularly, according to certain embodiments, the present invention provides that the correlation module 12 may be configured, and may be further used, to detect and redact words or data within the transcripts 22 that warrant privacy protection. For example, if transcribed words include a person's date of birth, social security number, health-related information, or other private and sensitive information, the correlation module 12 may be configured to detect such information and immediately redact that information within the transcript 22 (and within the corresponding record within the database 14)—or, in some embodiments, the correlation module 12 may inhibit the recordation of such sensitive information in real-time. Such procedures and functionality will be helpful in preventing the unauthorized disclosure and use of personal/private information, and to facilitate compliance with applicable privacy laws.

The invention provides that the correlation module 12 is configured to derive correlations (and the additional outputs mentioned above) between the written transcripts 22 and the metadata 24 (including both user-defined metadata 26 and machine-derived metadata 28) by detecting, for example, words that are present in the written transcripts a specified minimum number of times, word combinations that are present in the written transcripts 22, a word in a defined relationship with another word in the written transcripts 22, semantic content, or combinations or variations of the foregoing. More particularly, in some embodiments, the invention provides that the correlation module 12 may derive correlations between the transcripts 22 and metadata 24 (and associated outputs) using, in part, a set of keywords—e.g., words that are detected in the written transcripts 22 a specified minimum number of times (words that meet a specified threshold of usage). In such embodiments, the invention provides that a user of the systems described herein may modulate the specified threshold. In addition, the invention provides that keywords may consist of multiple variables, e.g., rules may be created whereby a word must be detected in a defined proximity to other specified words in order for that collection of words (or phrase) to be considered detected in a transcript 22. More specifically, in certain embodiments, the invention provides that such analyses, and correlation steps performed by the correlation module 12, may analyze the occurrence of certain words, and the relationships between different words, to determine if certain audio content is present. In addition to frequency of keyword usage, the invention provides that other forms of "machine learning" may be employed to identify correlations between the transcripts 22 and metadata 24 (and to calculate the additional outputs described herein). Still further, the invention provides that the correlation module 12 may be configured to utilize any of various known algorithms to derive correlations between the transcripts 22 and metadata 24. Non-limiting examples of algorithms that may be used in such embodiments include, but are not limited to, algorithms commonly known as C4.5, k-means, SVM (support vector machines), Apriori, EM (expectation-maximization), AdaBoost, kNN (k-Nearest Neighbors), Naive Bayes, CART (classification and regression trees), and/or derivatives of any of the foregoing algorithms.

As explained above, according to preferred embodiments of the present invention, systems for analyzing audio content are provided, which are configured to receive, transcribe, and derive predictions from streamed audio content in real-time. More particularly, the systems of such embodiments include a transcription module 10 that is configured to receive live audio content streamed to the system and execute speech-to-text transcriptions of the audio content (and/or segments thereof) in real-time, as such audio content is received by the transcription module. As used herein, the term "real-time" means that a specified action occurs immediately following another preceding action, e.g., when the specified action occurs within 1, 2, 4, 8, 16, or 32 seconds from the conclusion of a preceding action. For example, in the case of the speech-to-text transcriptions of portions of audio content, the transcription module 10 can be said to execute speech-to-text transcriptions of such audio content in real-time, when the processing unit of the system is operating at maximum speed (or near maximum speed) to execute such transcriptions. In these embodiments, the system will further include the correlation module 12 described herein, which is configured to derive a prediction based on the transcriptions in real-time (i.e., while the audio content is being streamed to the system and subsequently transcribed). The invention provides that the correlation module 12 is configured to immediately report the prediction to a user of the system (or, as mentioned above, issue such report after a minimum number of words have been transcribed).

Similar to the other embodiments described herein, the system will also include a database 14 in communication with the correlation module 12, which contains and makes accessible to the correlation module data that are used by the correlation module, along with the transcriptions, to derive the prediction (such data may include, for example, the user-defined metadata 26 and machine-derived metadata 28 described above). The invention further provides that, because the system is configured to receive, transcribe, and derive predictions from streamed audio content in real-time, the system may further be configured to modify the prediction reported to the user of the system over time, as additional audio content is received, transcribed, and analyzed by the correlation module 12.

The invention provides that such embodiments may be useful in a variety of applications. For example, such embodiments of the system may be useful in monitoring sales calls in real-time, and reporting to users whether the call is likely to lead to a sale (or not). In that example, the live audio content streamed to the system may consist of a sales call between a sales representative and a prospective customer. The prediction that is generated by the correlation module 12 may be whether the sales call satisfies a defined probability for resulting in a sale, e.g., the defined probability may be 50%, 60%, 70%, or some other percent probability that the sales call will eventually lead to a sale. In such embodiments, the prediction may be reported to the user of the system (or multiple users) via text message, e-mail, visual display within a user interface 18, or a combination of the foregoing. Still further, in such embodiments, the system may be configured to execute a responsive action based on the prediction. In the case of the sales call example, the responsive action may include termination of the sales call, transfer of the sales call from a first sales representative (e.g., a lower ranked sales person) to a second sales representative (e.g., a supervisor), issuing of an electronic notice to one or more persons within an organization, or combinations of the foregoing.

Figure 1:
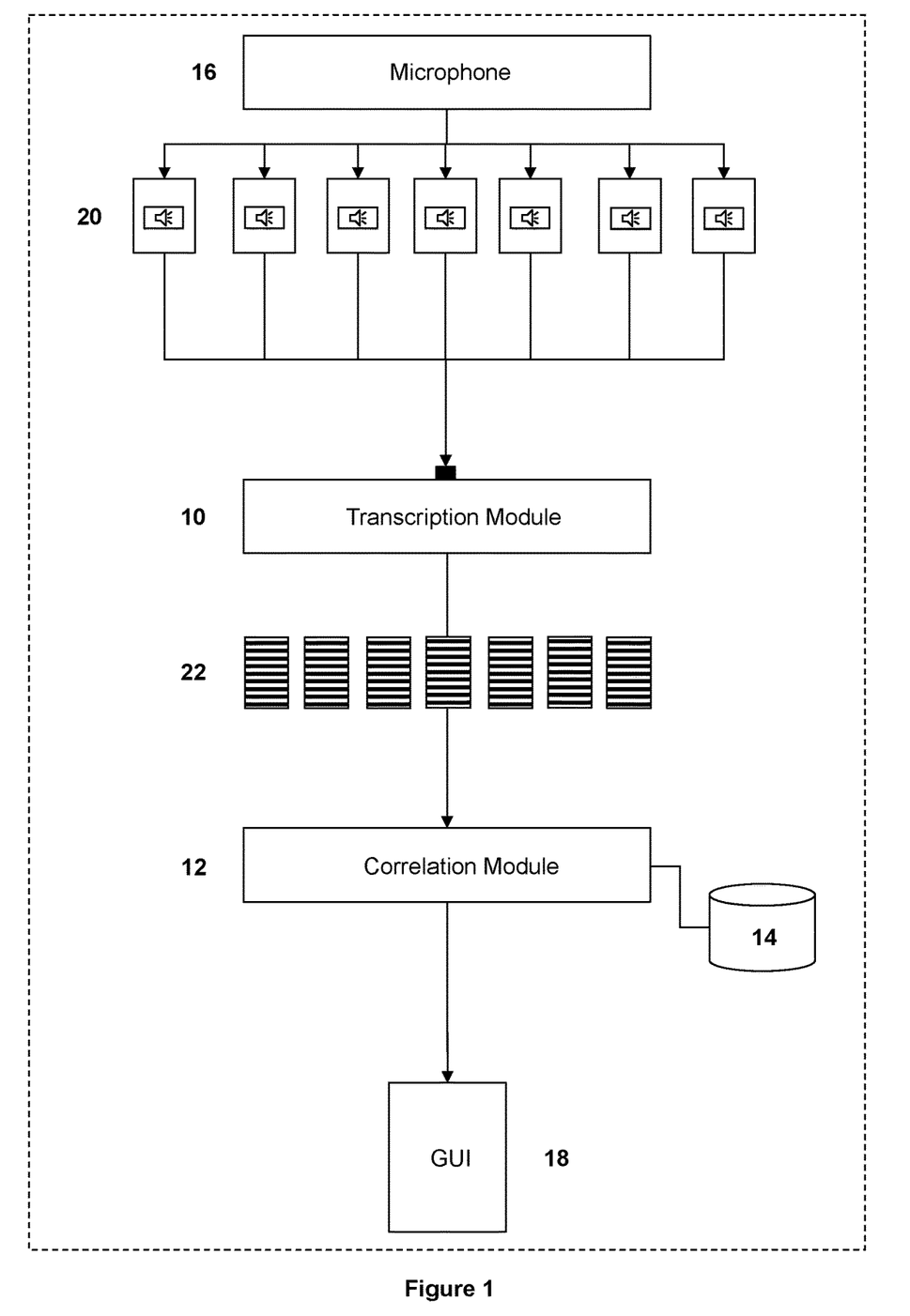
FIG. 1 is a diagram that illustrates certain components of the systems described herein, in which the microphone, transcription module, correlation module, and user interface are all included within a single unified machine.
Figure 2:
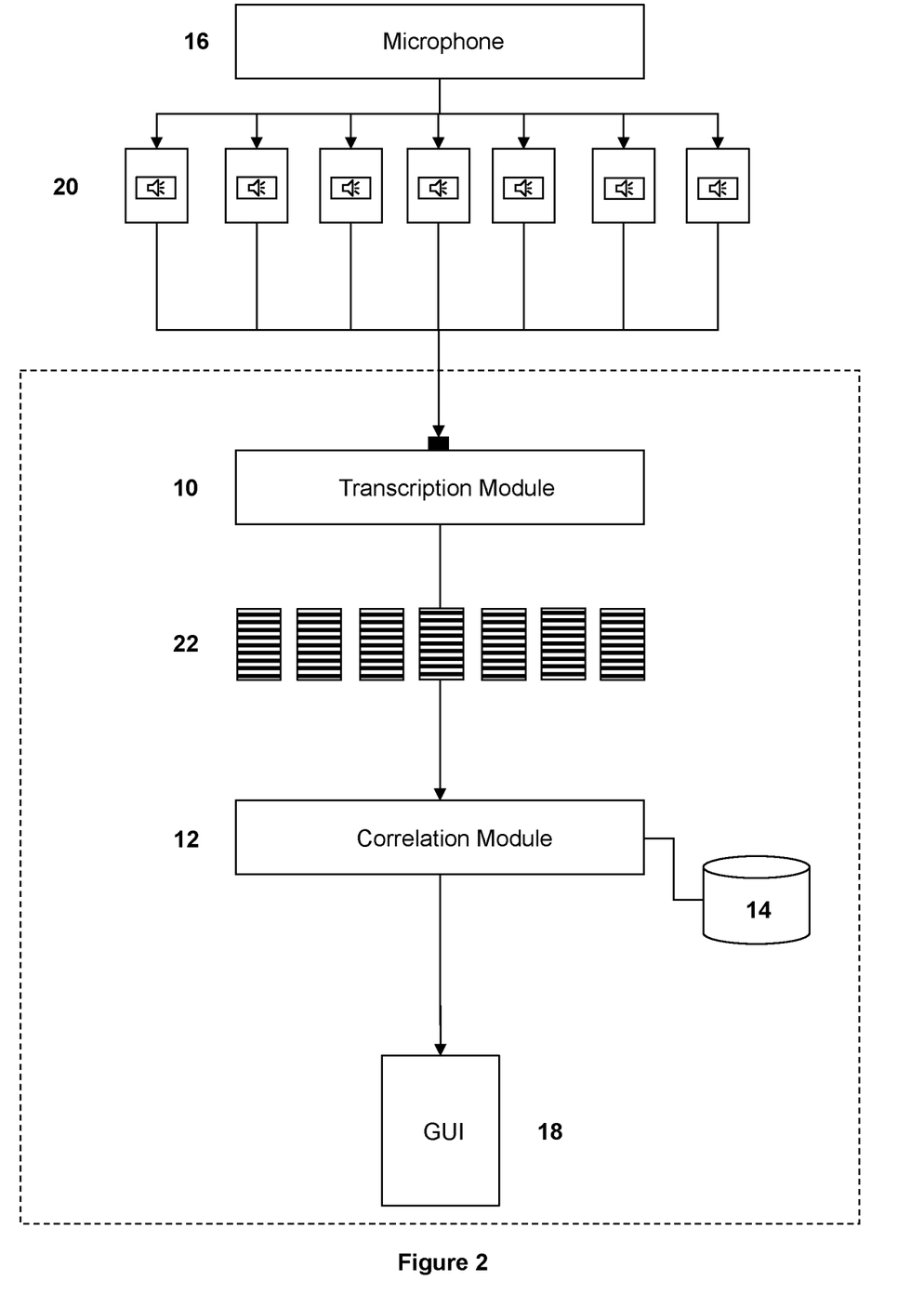
FIG. 2 is another diagram that illustrates certain components of the systems described herein, in which the transcription module, correlation module, and user interface are all included within a unified machine, while the microphone is located within its own separate machine.
Figure 3:
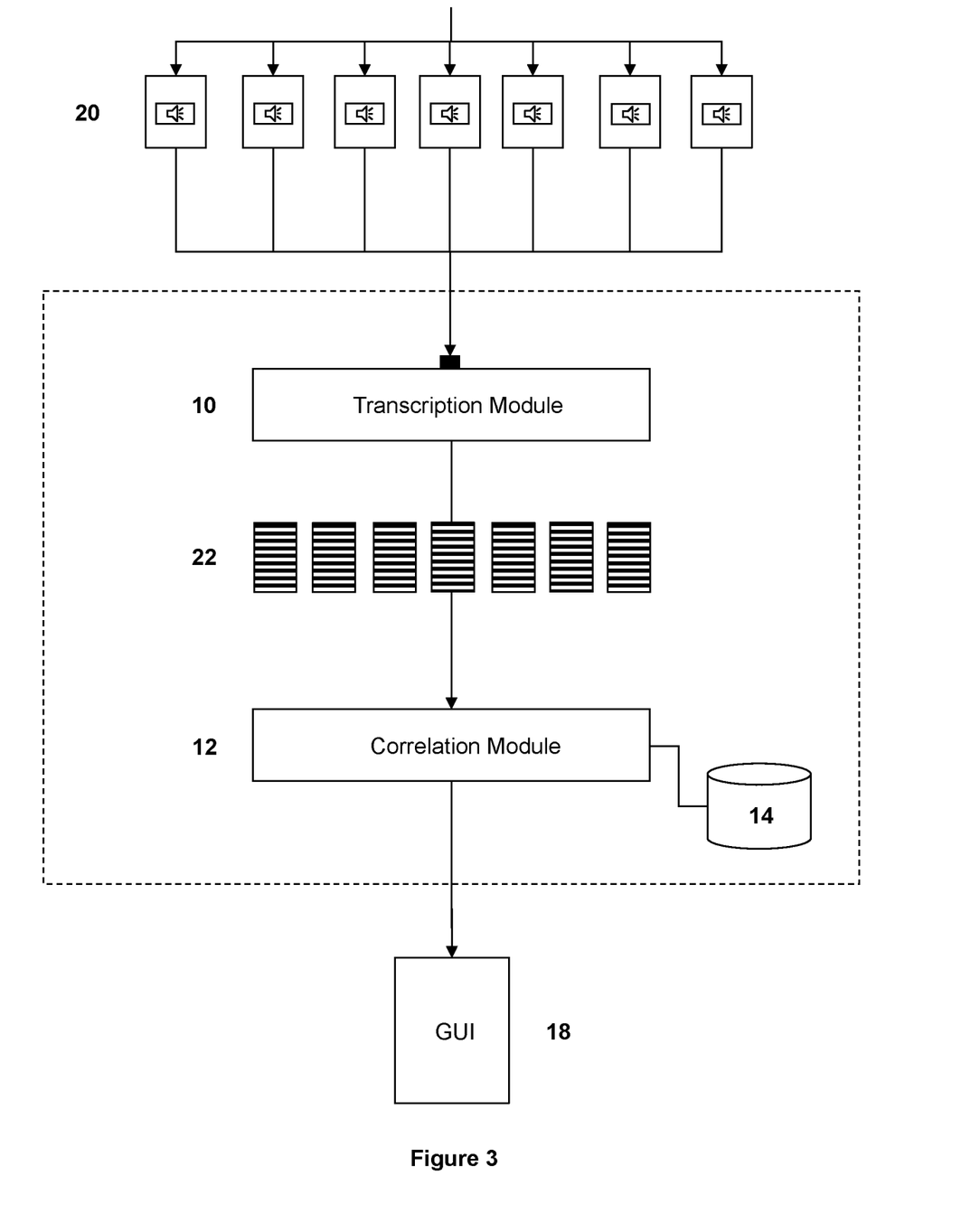
FIG. 3 is another diagram that illustrates certain components of the systems described herein, in which the transcription module and correlation module are included within a unified machine, but which excludes the microphone shown in FIG. 2.
Figure 4:
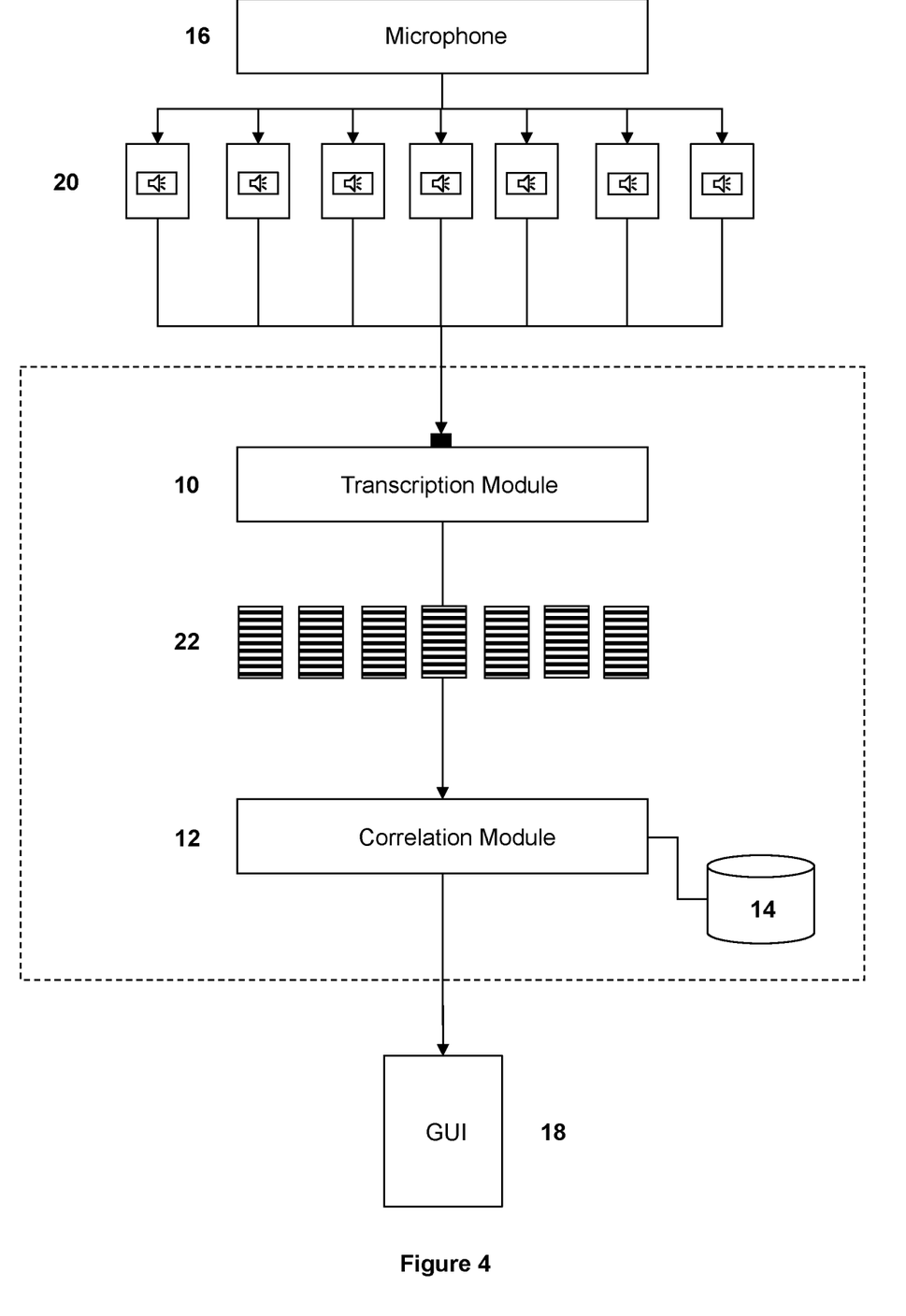
FIG. 4 is another diagram that illustrates certain components of the systems described herein, in which the transcription module and correlation module are included within a unified machine, while the microphone and user interface are located within their own separate machines.
Figure 5:
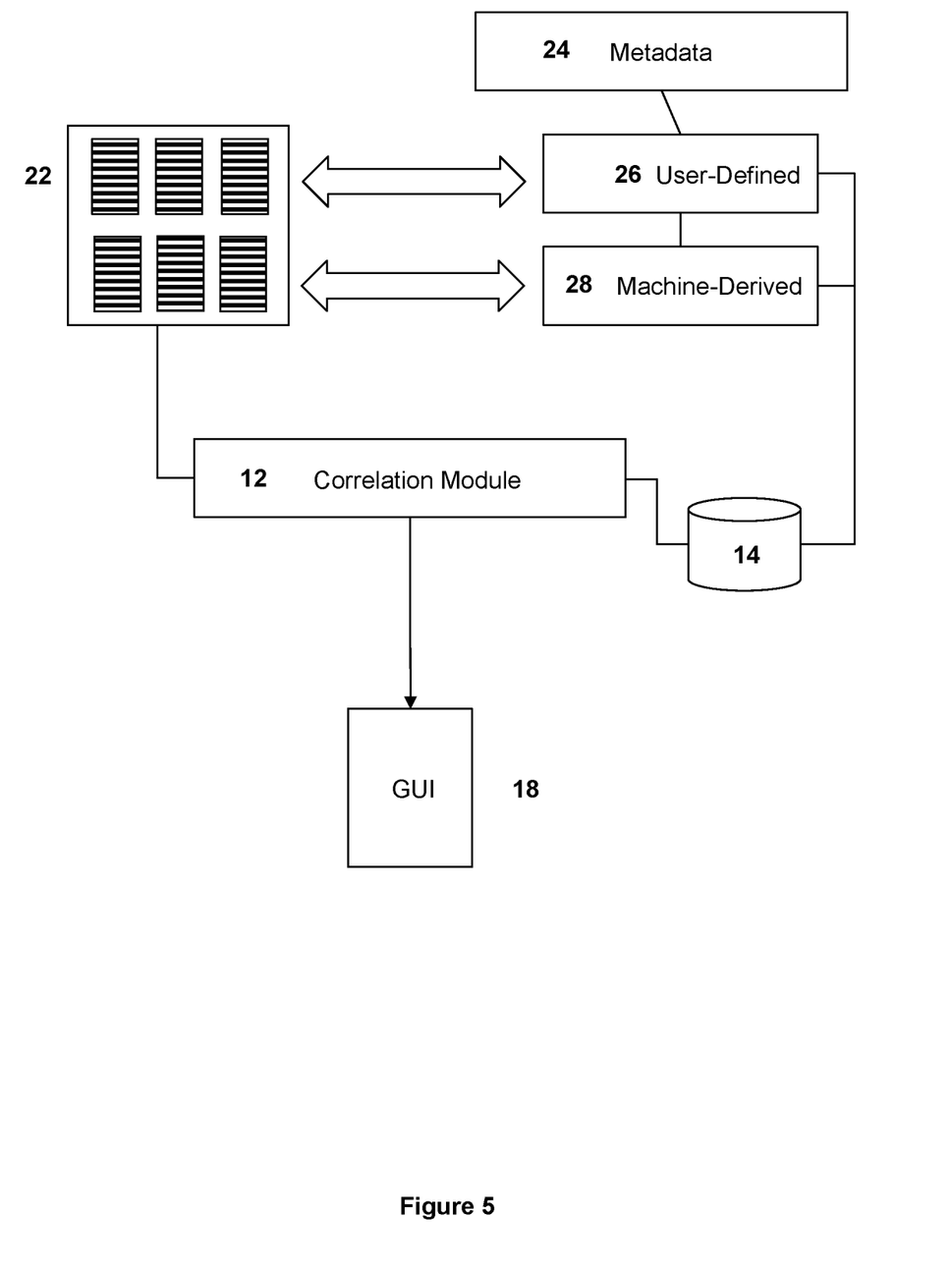
FIG. 5 is a diagram that illustrates the relationship between the audio file transcripts, metadata (including user-defined and machine-derived metadata), the correlation module, and the database described herein.
Figure 6:
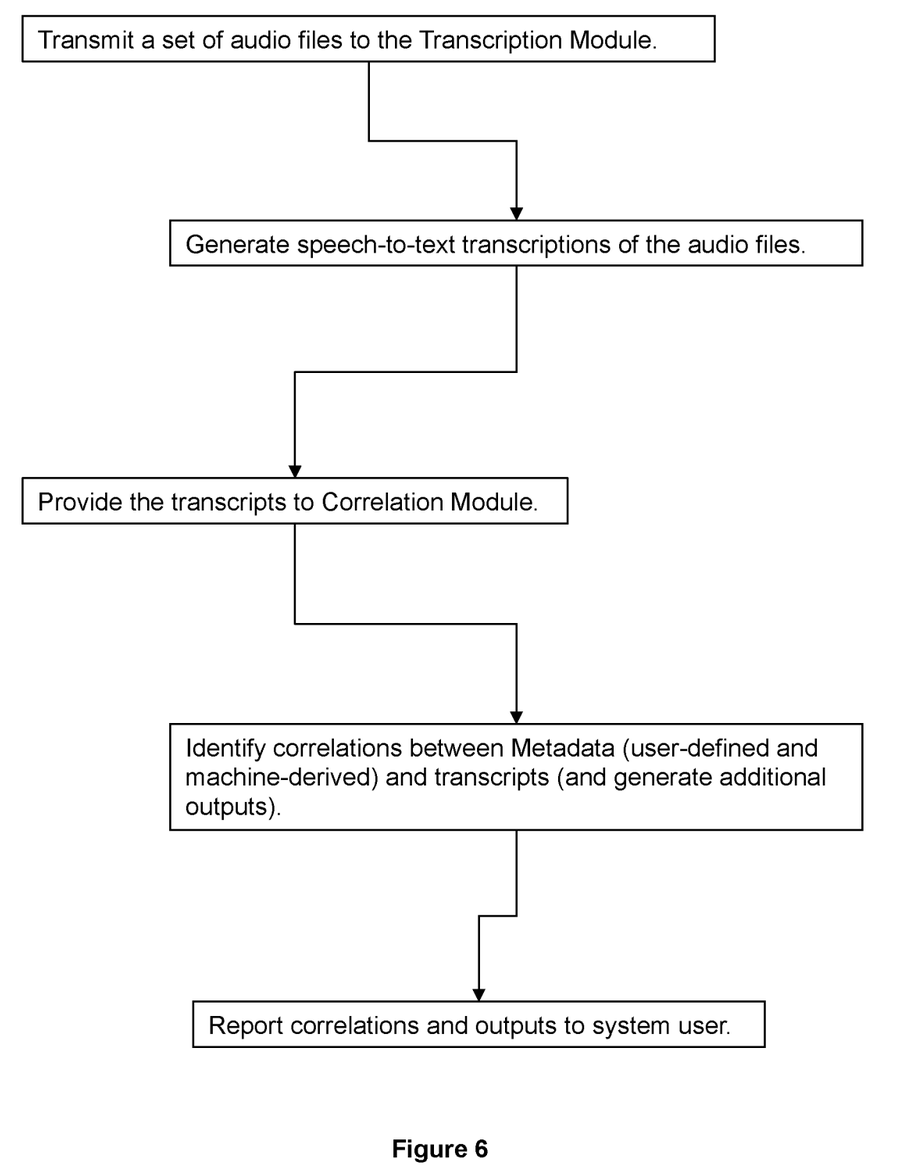
FIG. 6 is a diagram that summarizes certain methods of the present invention.

The invention provides that the various components of the systems described herein may exist within a single machine (FIG. 1). In other embodiments, the various components of the system may exist within separate machines (FIGS. 2, 3, and 4), while being operably connected and in communication with each other. For example, the invention provides that the transcription module 10, correlation module 12, database 14, microphone 16 (optional), and user interface 18 may all exist within a single unified machine (FIG. 1), which represents a system of the present invention. In other embodiments, the various components of the system may exist within a number of separate machines that are operably connected and in communication with each other—e.g., the optional microphone 16 may exist within a mobile phone; the transcription module 10 may exist within a first server; the correlation module 12 may exist within its own server (or it may reside within the same server as the transcription module 10); the database 14 may reside within its own server (or share a server with another component of the system); the user interface 18 may reside within a computer that is operably connected to the system; and so on. In addition, the invention provides that the systems described herein will preferably include a memory component and processor. When the system is combined into a single machine (e.g., FIG. 1), the memory component and processor may be shared among the different components of the system, e.g., a shared memory source, a shared processor, a shared user interface, etc.

In addition to the systems described above, as summarized in FIG. 6, the present invention further encompasses methods for analyzing audio content and, specifically, methods for transcribing audio content into text, deriving correlations between the text and certain outcomes (and metadata) associated with the original audio content (and calculating the outputs described herein), and reporting such correlations and outputs to users of the systems, as described further below. Such methods generally entail using the systems described above to carry out such methods. For example, referring to FIG. 6, such methods include the steps of transmitting a set of audio files 20 to the transcription module 10; generating speech-to-text transcriptions 22 of the audio files (or portions thereof) in real-time; providing the transcripts 22 to the correlation module 12 in real-time; instructing the correlation module 12 to identify correlations between metadata 24 (including user-defined metadata 26 and machine-derived metadata 28) and the transcripts 22 (and instructing the correlation module 12 to calculate the additional outputs described herein); and reporting such correlations and outputs to a user of the system (with such reports being issued at times and at frequencies described above).

The many aspects and benefits of the invention are apparent from the detailed description, and thus, it is intended for the following claims to cover all such aspects and benefits of the invention that fall within the scope and spirit of the invention. In addition, because numerous modifications and variations will be obvious and readily occur to those skilled in the art, the claims should not be construed to limit the invention to the exact construction and operation illustrated and described herein. Accordingly, all suitable modifications and equivalents should be understood to fall within the scope of the invention as claimed herein.

What is claimed is:

1. A system for analyzing audio content, which comprises:
   (a) a transcription module that is configured to (i) receive a plurality of audio files generated by a plurality of different sources, (ii) execute speech-to-text transcriptions in real-time based on portions of audio content included within the audio files, and (iii) generate written transcripts of such transcriptions in real-time;
   (b) a correlation module that is configured to (i) receive metadata associated with each of such audio files or portions thereof, (ii) derive correlations between such written transcripts and metadata, and (iii) report such correlations to a user of the system, wherein said report is issued:
      (1) continuously as additional words are transcribed and the written transcripts become larger; and/or
      (2) once a threshold number of words have been transcribed within the written transcripts; and
   (c) a database that is configured to receive, record, and make accessible for searching and review the correlations generated by the correlation module, wherein the correlation module is further configured to inhibit recordation of sensitive information that is subject to privacy laws that is included within said audio files.

2. The system of claim 1, wherein the metadata is user-defined metadata that is specified by a user of the system.

3. The system of claim 2, wherein the user-defined metadata is categorized into one of a plurality of different pre-defined categories.

4. The system of claim 3, wherein the pre-defined categories of user-defined metadata indicate to the user whether a person who is featured in the audio content (a) purchased a product or service, (b) submitted a complaint about a product or service, (c) received unsatisfactory responses to questions submitted, (d) received satisfactory responses to questions submitted, or (e) combinations of (a)-(d).

5. The system of claim 4, wherein the pre-defined categories of user-defined metadata further include one or more free-form categories that are defined by and unique to the user.

6. The system of claim 5, wherein the metadata further include machine-derived metadata, which include (a) a geographical region from which the audio content originated; (b) demographic information that is correlated with such geographical region; (c) a phone number from which the audio content originated; (d) whether information disclosed in the audio content warrants privacy protection; (e) a length of time that represents a duration of the audio content; (f) tone-related data; (g) amplitude-related data; (h) frequency-related data; (i) rates of change data; or (j) combinations of (a)-(j).

7. The system of claim 6, wherein the correlation module is configured to derive correlations between the written transcripts and the user-defined metadata and machine-derived metadata by detecting (a) words that are present in the written transcripts a specified minimum number of times, (b) word combinations that are present in the written transcripts, (c) a word in a defined relationship with another word in the written transcripts, (d) semantic content, or (e) a combination of (a)-(d).

8. The system of claim 7, wherein the transcription module, correlation module, and database exist within separate machines.

9. The system of claim 7, the transcription module, correlation module, and database exist within a single unified machine.

10. The system claim 7, which further comprises a microphone that is configured to receive audio content, convert the audio content into an audio file, and transmit the audio file to the transcription module.

11. The system of claim 10, which further comprises a graphical user interface that is configured to display correlations between the written transcripts and metadata.

12. A system for analyzing audio content, which comprises:
   (a) a transcription module that is configured to (i) receive a plurality of audio files generated by a plurality of different sources, (ii) execute speech-to-text transcriptions in real-time based on portions of audio content included within the audio files, and (iii) generate written transcripts of such transcriptions in real-time;
   (b) a correlation module that is configured to (i) receive metadata associated with each of such audio files or portions thereof, (ii) derive correlations between such written transcripts and metadata, (iii) derive additional outputs based on said correlations, and (iv) report such correlations and outputs to a user of the system, wherein said report is issued:
      (1) continuously as additional words are transcribed and the written transcripts become larger; and/or
      (2) once a threshold number of words have been transcribed within the written transcripts; and
   (c) a database that is configured to receive, record, and make accessible for searching and review the correlations and outputs generated by the correlation module, wherein the correlation module is further configured to inhibit recordation of sensitive information that is subject to privacy laws that is included within said audio files.

13. The system of claim 12, wherein the additional outputs comprise summaries of said correlations, conclusions derived from said correlations, and classification data, numerical scores, and rankings attributed to said audio content.

14. The system of claim 12, wherein the transcription module is configured to receive audio files via a digital connection, wherein the audio files consist of live audio content streamed to the system.

15. The system of claim 12, wherein the metadata is user-defined metadata that is specified by a user of the system.

16. The system of claim 12, wherein the metadata include machine-derived metadata, which include (a) a geographical region from which the audio content originated; (b) demographic information that is correlated with such geographical region; (c) a phone number from which the audio content originated; (d) whether information disclosed in the audio content warrants privacy protection; (e) a length of time that represents a duration of the audio content; (f) tone-related data; (g) amplitude-related data; (h) frequency-related data; (i) rates of change data; or (j) combinations of (a)-(j).

17. The system of claim 12, wherein the correlation module is configured to derive correlations between the written transcripts and user-defined metadata and machine-derived metadata by detecting (a) words that are present in the written transcripts a specified minimum number of times, (b) word combinations that are present in the written transcripts, (c) a word in a defined relationship with another word in the written transcripts, (d) semantic content, or (e) a combination of (a)-(d).

18. The system of claim 12, wherein the transcription module, correlation module, and database exist within separate machines.

19. The system of claim 12, the transcription module, correlation module, and database exist within a single unified machine.

* * * * *